Jan. 10, 1950
F. GUBING
2,494,122
CIRCUIT BREAKER
Filed Jan. 24, 1946
5 Sheets-Sheet 1
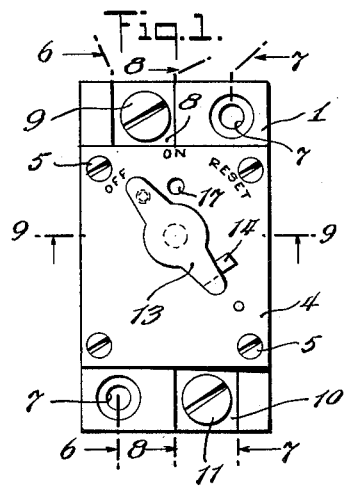
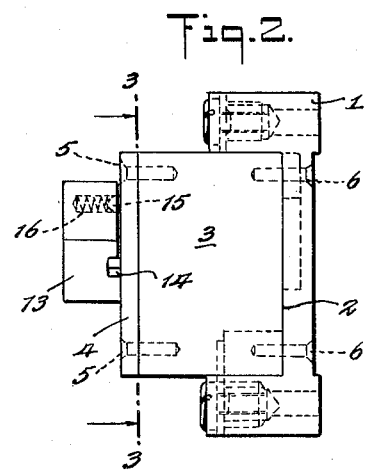
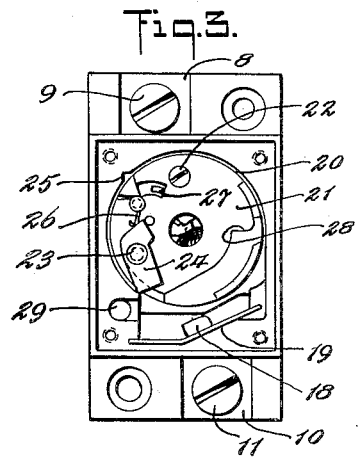
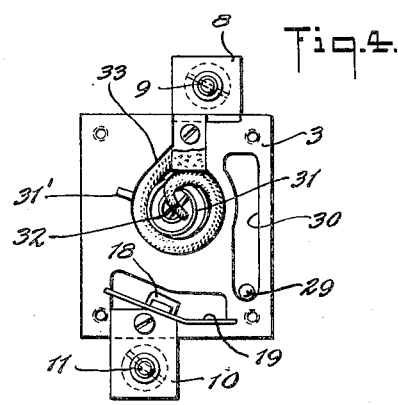
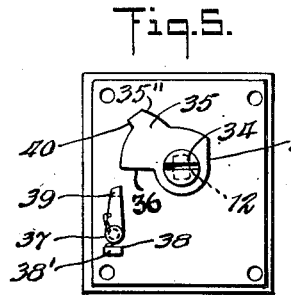
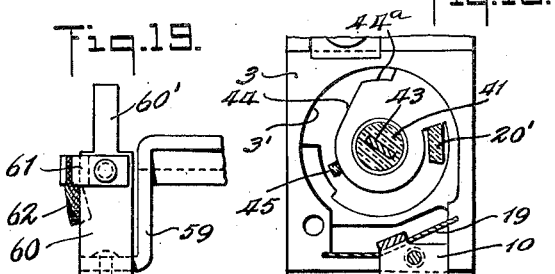
INVENTOR.
FRANK GUBING
BY Darby & Darby
ATTORNEYS.

INVENTOR.
FRANK GUBING

Jan. 10, 1950         F. GUBING         2,494,122
CIRCUIT BREAKER
Filed Jan. 24, 1946         5 Sheets-Sheet 3

INVENTOR.
FRANK GUBING
BY Darby & Darby.
ATTORNEYS.

Jan. 10, 1950  F. GUBING  2,494,122
CIRCUIT BREAKER
Filed Jan. 24, 1946  5 Sheets-Sheet 4

INVENTOR.
FRANK GUBING
BY Danby & Danby
ATTORNEYS.

Jan. 10, 1950   F. GUBING   2,494,122
CIRCUIT BREAKER
Filed Jan. 24, 1946   5 Sheets-Sheet 5
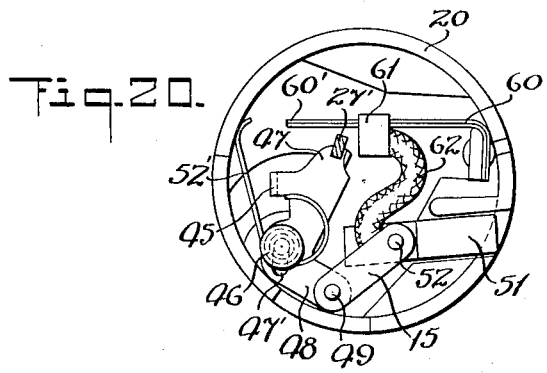
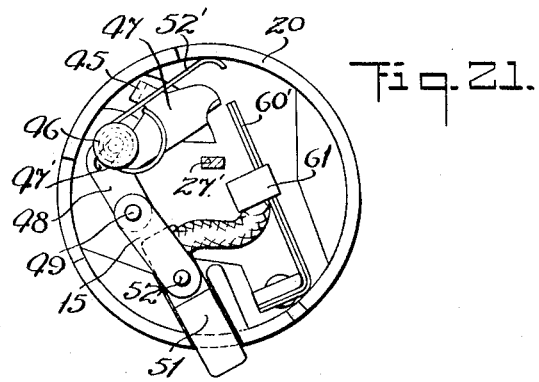
INVENTOR
FRANK GUBING
BY Darby & Darby
ATTORNEYS.

Patented Jan. 10, 1950

2,494,122

UNITED STATES PATENT OFFICE 2,494,122

CIRCUIT BREAKER

Frank Gubing, Brooklyn, N. Y., assignor to Circuit Breakers Corporation, New York, N. Y., a corporation of New York Application January 24, 1946, Serial No. 643,083

13 Claims. (Cl. 200—116)

This invention relates to improvements in circuit interrupting devices of the type including overload actuating mechanism of one form or another for causing the switch to open the circuit when a predetermined load is exceeded.

More particularly, the invention is concerned with circuit breakers which are small, simple structurally, and inexpensive to manufacture so as to be competitive with ordinary fuses as employed in house lighting circuits and the like.

The general, most important, object of the invention is, therefore, to provide in a compact, rugged and inexpensive form a circuit breaker which may be employed in the place of ordinary fuses in house lighting circuits.

An important object of this invention is to provide a latching mechanism for a circuit breaker including a pair of cooperating members which are automatically held out of engagement as the circuit breaker is operated to closed position.

Another object of this invention is to provide a pair of cooperating latching members cooperating so as not to be subject to wear in use so as to insure the maintenance of accurate calibration of the circuit breaker.

Many other and more detailed objects of the invention will be apparent from the following detailed description when taken in connection with the attached drawings.

Another object of this invention is to provide an improved structure similar to that disclosed in United States Patent 2,261,139, granted November 4, 1941, for "Circuit breaker" wherein the objects recited above are accomplished in a more practical way.

This invention resides substantially in the combintion, construction, arrangement and relative location of parts, all in accordance with this disclosure.

In the accompanying drawings—

Figure 1 is a top plan view thereof;

Figure 2 is a right hand side elevational view thereof;

Figure 3 is a view taken on the line 3—3 of Figure 2, that is, with the cover of the housing removed;

Figure 4 is a bottom plan view of the switch housing as it appears when removed from its supporting base;

Figure 5 is a bottom plan view of the cover for the housing;

Figure 14 showing the parts in position just before the main contacts close and Figure 15 showing the final position of the parts when the contacts are closed;

Figure 9:
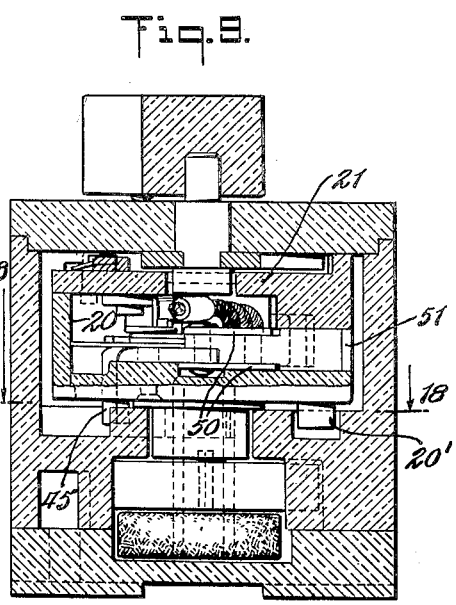
Figure 9 is a cross-sectional view taken on the line 9—9 of Figure 1.
Figure 12:
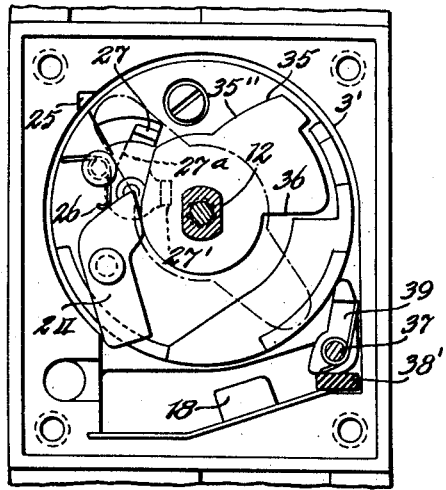
Figure 12 is a view taken on the line 12—12 of Figure 8 showing certain parts in cross-section and leaving the parts mounted on the lower side of the main cover in place; these parts being in open circuit position.
Figure 13:
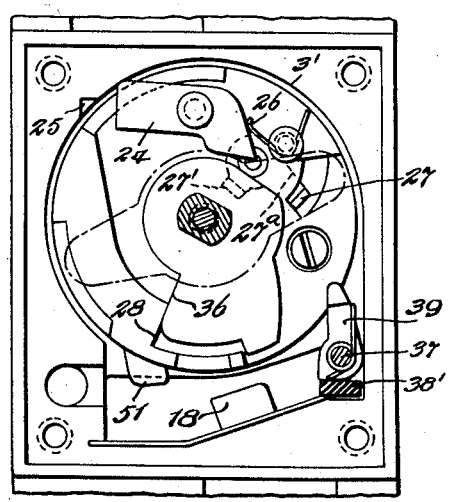
Figure 13 is a view similar to Figure 12 but showing the parts in a position corresponding to that of Figure 11.
Figure 14:
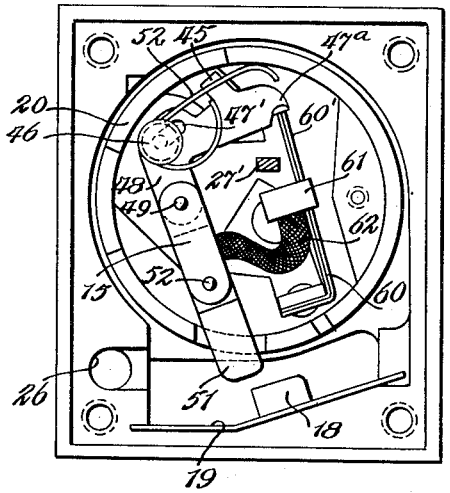
Figures 14 and 15 are views similar to Figures 10 and 11.
Figure 15:
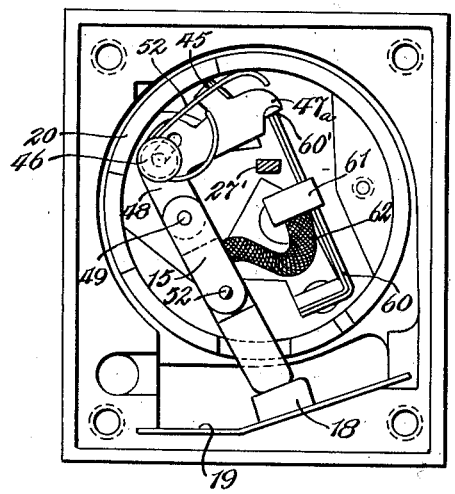
Figure 16:
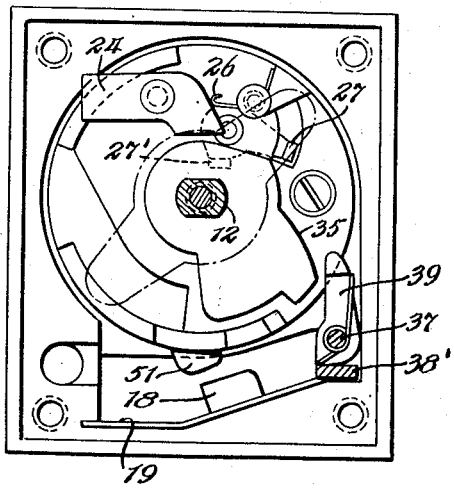
Figure 17:
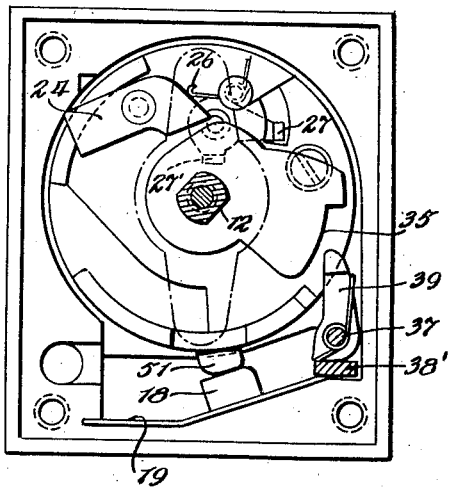

Figures 16 and 17 are views similar to Figures 12 and 13 with the cover parts in positions corresponding to the position of the other parts as illustrated in Figures 14 and 15, respectively;

Figure 18 is a view taken along the line 18—18 of Figure 9;

Figure 19 is an enlarged detailed view of the bi-metal element and its support;

Figure 20 is a top plan view of the rotatable carrier showing the position of the latching member upon initial rotation of the carrier in "on" direction;

Figure 21 is a similar view showing the position of the latching member upon further rotation of the carrier in "on" direction just before the finger 45 reaches the shoulder formed by the juncture of the camming surfaces 44 and 44a, Figure 18.

A great deal of effort, time and money has been spent in an attempt to build a circuit breaker which would be comparable in size to the ordinary screw type of fuse plug now commonly employed for the protection of electric light and power circuits. The tests to which such devices are put by the Fire Underwriters Laboratories before they are approved for use are so severe that while circuit breakers have been developed and are sold for this purpose they are relatively large and expensive, with the result that a truly competitive switch for these uses has not yet been produced. The switch herein disclosed is little larger than a screw type of fuse plug, and in accordance with this invention has been so simplified in structure as to be competitive therewith in cost. The devices of the figures of these drawings are substantially full size and it will be seen that the screw plug type of circuit breaker illustrated in the drawings is about the size of a screw plug fuse. The mechanism of the various forms of the invention has been so simplified and constructed as to be capable of meeting all the tests for approval and is entirely capable of withstanding many hundreds of repeated operations.

While the structure of the aforementioned patent has commercial utility there are certain features thereof upon which considerable improvement is made by reason of the construction herein disclosed. The calibration and the maintenance of the calibration of circuit breakers of this type and particularly of thermal circuit breakers is difficult of accomplishment in mass production manufacture and everyday use. As will appear hereinafter, the calibration of the circuit breaker is dependent upon the accurate cooperation and especially the relative static positioning of a pair of cooperating latching members which hold the members in circuit breaking position. Undue wear of these cooperating latching members destroys the calibration and, therefore, the useful life of the device.

In accordance with the structure herein disclosed, one of the latching members has imparted thereto during closing movement of the circuit breakers, first, a motion of recession with respect to the other latching member until it has moved beyond it whereupon, upon the final closing motion of the circuit breaker, it is given a motion of progression to an overlapping relation with respect to the other latching member. The result is that the wear on these members resulting from repeated operations is minimized with the result that the original calibration is maintained over long periods of use.

As illustrated in the various figures, it includes a base 1 of suitable insulating material which, as is clear from the drawings, consists of a substantially rectangular body of insulating material cut away intermediate its ends and throughout its width as indicated at 2 to receive the main housing 3 which is likewise of a suitable insulating material. This housing is of substantially rectangular form and is provided with a removable cover 4 held on the housing by means of the screws 5. The housing is held in the base by means of the screws 6 (see Fig. 2). At diametrically opposite corners the base is provided with holes 7 through which screws or bolts may be passed for mounting the switch. At one end of the base is a terminal strip 8 provided with a binding screw 9 by means of which one of the circuit wires may be attached and at the other end is a terminal strip 10 provided with a binding screw 11 by means of which the other circuit wire may be attached. It may be here noted that the structure now being described is of the single pole type.

Figure 8:
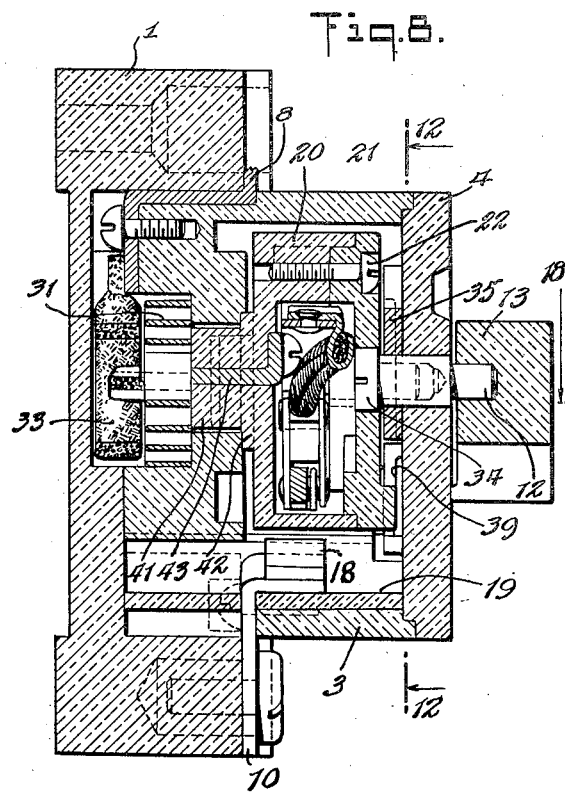
Figure 8 is a cross-sectional view taken on the line 8—8 of Figure 1.

The removable cover 4 is provided with a short shaft 12, one end of which is secured in any suitable way as by molding in a manual operating knob 13, as illustrated for example in Figure 8. The other end of the shaft, which has flattened sides, as illustrated clearly in Figure 8, has mounted thereon a cam 35 (see Fig. 5) which has a complementary opening so that the shaft and cam must move together. The cam is held on the shaft by means of a screw 34 having a cylindrical head as shown in Figure 8. Thus when the manual operating knob 13 is rotated cam 35 rotates with it close to the under-surface of the cover 4. Formed on top of the cover 4 at a suitable point is a stop 14 which engages one end of the knob 13. In the other end of the knob is a spring pressed detent comprising a ball 15 and a spring 16, see Figure 2. As shown in Figure 1 the cover is provided with a depression 17 in which the ball 15 rests when the switch is in "on" position, at which time it is straight up and down.

The conductor strip 10 extends up into the housing from the bottom, see Figure 8, and has secured thereto in conducting relation the main fixed contact 18. That portion of the housing adjacent this contact is shielded by means of a piece of insulating material 19 (see Fig. 11) of suitable characteristics, such as horn fibre, which does not carbonize in the spark resulting when the circuit breaks. Thus the high resistance of the switch is maintained through a long life.

As is clear from Figures 3 and 18, the housing 3 is shaped to form a chamber on the interior thereof which for a considerable portion thereof is substantially circular. Mounted in this chamber is the movable contact carrier or member 20 which is made of any suitable insulating material, preferably in the form of a cylinder. This member is hollow and contains the operating mechanism of the switch. It is provided with a removable cover 21 which is held thereon by means of a screw 22. The sides of the carrier 20 and the cover 21 are of complementary shape and interengage so that there is no tendency of one to rotate with respect to the other. On top of the cover 21 is pivotally mounted on the pivot pin 23 a latch 24 which is engaged by a spring 26, as illustrated clearly in Figure 3. The lower end of the latch 24 engages, as will be described later, in a notch 25 in the circular wall of the main housing. A finger 27 extends up through the cover 21 through a suitable opening therein and by means of it, as will be explained later, the switch may be manually opened through the operating knob 13 when desired. The cover 21 has an upwardly extending shoulder 28 (see Fig. 12) formed thereon for cooperation with the cam 35, as will be explained later.

Figure 6:
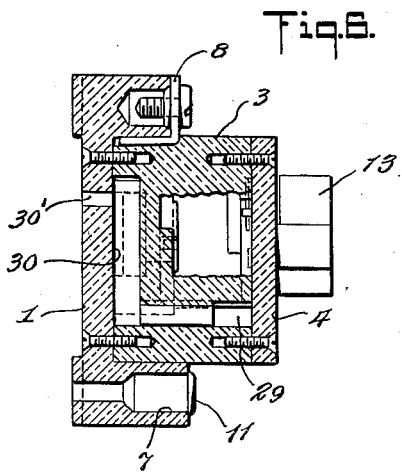
Figure 6 is a cross-sectional view taken on the line 6—6 of Figure 1, omitting some details in order to illustrate the explosion chamber.
Figure 7:
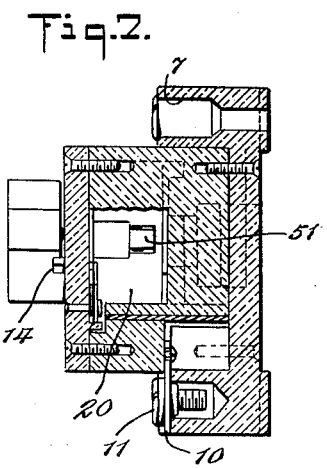
Figure 7 is a similar view taken on the line 7—7 of Figure 1 showing a portion of the movable contact carrier in elevation.

Extending downwardly through the wall of the main housing in the region of the fixed contact 18 is a passage 29, see Figure 6, which opens into a chamber 30 formed by a recess in the bottom of the housing 4, which is closed by the base 1 when the parts are assembled. The base 1 is provided with an aperture 30' which connects this chamber with the atmosphere.

In the bottom wall of the main casing 3 is a recess in which a spiral spring 31 lies (see Fig. 8). The inner end of this spring engages in a slot in the lower end of a lead strip 43 (Figure 4) which extends upwardly into the carrier 20, as clearly illustrated in Figure 8. The outer end 31' of the spring rests in a radial slot in the housing 3. Also secured in the end of the conductor strip 43 by means of solder or other suitable fastening means is one end 32 (Figure 4) of a flexible pigtail or stranded conductor 33. The other end of this conductor is secured, as by soldering, to the terminal strip 8.

As illustrated in Figures 5 and 17, the cam 35 is provided with a working face 36, a shoulder 40, and another working face 35' for purposes to be later described. Mounted on the lower face of the cover 4 on a pivot pin 37 is a latch 39 which is held in the position shown in Figure 5 by means of a spring 38 and a stop 38' secured on the cover.

The cylindrical carrier 20 is provided with a central hub 41 (see Fig. 8) which projects into a hole in the base of the housing 3 in alignment with the coil spring 31. At the point of the connection between the hub 41 and the carrier 20 is an integral shoulder or collar 42 which rests on the top side of the bottom wall of the casing. It will be noted that the hub 41 has a loose fit in the passage in which it lies. At this point it will be noted that the head of screw 34, see Figure 8, projects into a central hole in the cover 21 of the movable member 20. This hole is large enough to likewise provide a loose fit for a purpose to be described later.

Referring to Figure 18, it will be seen that the bottom wall of the casing 3 in the main chamber is cut away to form a groove which is partly circular at 44ª and partly straight, as indicated at 44, which straight side gradually recedes from the center of the chamber. At 20' is a lug formed on the bottom of the carrier 20, see also Figure 9, which serves as a stop by engaging the end wall of the circular portion of the groove to limit the counter-clockwise or circuit opening movement of the carrier 20. A finger 45 projects into this groove for cooperation with the cam surface 44. This finger piece is an integral part of a bellcrank lever 47, see Figures 10 and 14, for example, and projects down through the bottom wall of the carrier, as is clear from Figure 9.

Figure 10:
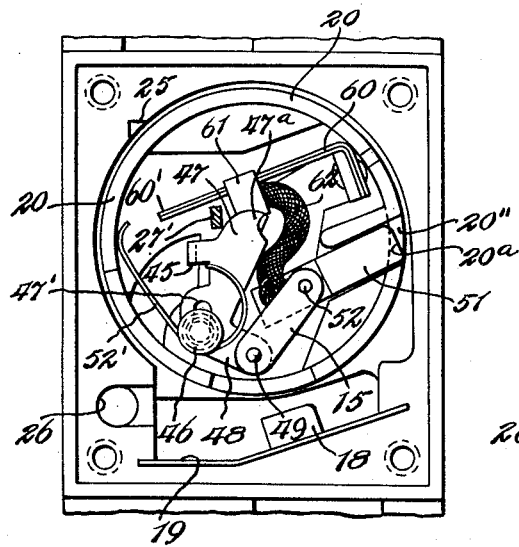
Figure 10 is an enlarged top plan view of the switch with some parts broken away, the main cover removed, and the movable contact cover removed, showing the switch in open circuit position.

Referring to Figures 10 and 14, for example, it will be seen that the lever 47 is pivotally mounted on a pivot pin 46 secured on the bottom wall in the carrier 20. This lever is of bellcrank formation and is pivotally connected by the arm 48 thereof at 49 to a pair of links 50. Pivotally mounted between these links at 52 is a contact 51 which is positioned for sliding movement in the direction of its length along a chord of the cylindrical carrier, as is clear from Figure 10. This contact may slide through an opening 20'' in the side wall of the carrier 20.

The lever 47 has a slot 47' (see Fig. 11) at the pivot pin 46 for a purpose to be described and a spring 52' encircles the pivot pin 46 and has one end bearing on the adjacent wall of cylinder 20 and its other end bears on lever 47, engaging in back of the shoulder formed by finger 45. The bell crank lever 47, and the links 50 are preferably made of metal but need not necessarily be made of metal since they do not carry any current. As will be seen from Figures 10 and 11, the lever 47, the links 50 and the contact 51 form a toggle arrangement and the spring 52' tends to move this toggle arrangement out of straight line position to the broken down position shown in Figure 10.

At this point it may be noted from Figures 12 and 19 that the finger piece 27 is on a lever 27ª pivotally mounted on the under-side of the cover 21 of the carrier. Also mounted on this lever so as to depend down into the carrier is a finger piece 27' which occupies various positions as indicated in the drawings.

At 59 (see Fig. 11) is a right angle support which is secured in the carrier to the lead strip 43 by means of a screw 43'. Secured to the support 59 is a bimetal arm 60 which is connected to the contact 51 by means of a flexible lead or pigtail 62. The lead is secured to the contact in any suitable way, as by soldering or the like, and is attached to the bimetal arm 60 by means of a clip 61, solder, rivets, and the like. As illustrated in Figure 19, the bimetal lever 60 is connected to the lead intermediate its ends. The free projecting end 60' is of less width, and hence mass, than the remainder thereof for a purpose to be described later.

Figure 11:
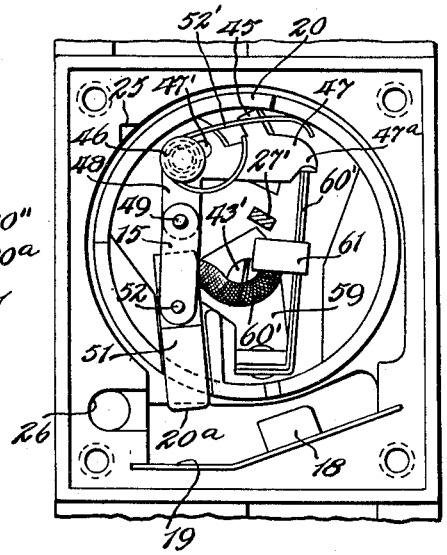
Figure 11 is a similar view showing the carrier moved to its extreme clockwise position.

The manner in which this device operates will now be described, it being first noted that the switch has three positions, "off," "re-set," and "on," as indicated on the cover, see Figure 1. It will be of some help to realize that the parts are shown in Figures 1, 3, 5, 10 and 12 in "off" position; in Figures 14 and 15 in "re-set" position; and in Figures 15 and 17 in "on" position. There is a position between the "off" and "re-set" positions which is indicated in Figures 11 and 13. When the parts are in "off" position the operating handle or knob 13 is in the position shown in Figure 1, which leaves the cam 35 and the latch 39 in the position shown in Figure 5. The carrier 20 is in the position shown in Figures 3 and 10, the latter of which shows the position of the parts within the cover. Figure 12 shows the position of the parts on the cover as well as the position of the carrier.

In order to close the device the operator turns the knob 13 in a clockwise direction from the "off" position, as far as it will go, bringing its upper end in the region of the "re-set" position. In doing this he causes the carrier 20 to rotate from its position in Figure 10 to its position in Figure 13. The carrier is caused to move to this position by reason of the fact that the face 36 (see Fig. 13) of the cam 35 has engaged the shoulder 28 on the cover 21 of the carrier 20. During movement to this position the finger 45 has moved out along the cam face 44, Figure 18, and in so doing has caused the bellcrank lever and connected linkages to move out to a straight line position as shown in Figure 11, projecting the contact 51 from its withdrawn position, Figure 10, to the position shown in Figure 11. As carrier 20 begins to turn, finger 45, engaging camming surface 44 (Fig. 18), is held fixed in a radial direction although it can slide along this camming surface. The result is that lever 47 slides on pivot pin 46 because of the slot 47', and the end of spring 52', between the pivot pin 46 and shoulder formed by finger 45, is put in sharper curvature to further compress it. This sliding movement of lever 47 causes its latching end 47ª to recede from the plane of bi-metal element 60. Lever 47 continues to slide until the end of slot 47' engages pin 46, as shown in Figure 20. Further rotation of carrier 20 now causes lever 47 to pivot counterclockwise (Fig. 10) on pivot pin 46, further stressing the other end of spring 52'. Lever 47 continues this pivoting movement causing toggle 50—51 to pivot into a straight line, until the parts assume the position shown in Figure 21. Just as the toggle linkage system reaches a straight line position the finger 45 passes beyond the camming surface 44 (see Figure 18) to a point opposite the more or less circumferential portion 44ª. At this instant the loaded curved end of spring 52' slides the lever 47 on pivot pin 46 towards the free end of the bimetal element until its shoulder end 47ª overlies the end of the bimetal element, and finally it is moved to engage therewith by that spring as shown in Figure 11. As lever 47 thus slides the toggle 50—51 remains straightened and pivots at 52. These parts are then in the position clearly shown in Figure 14 and retain that position as the breaker is released to cause engagement of the main contacts, as shown in Figure 15 and as will be explained in more detail below. Thus it will be seen that the cooperating member 47 and the end 60' of the bi-metal lever 60 latch the toggle linkage in a straight line position without having frictional engagement during operation of the circuit breaker to closed operation. The result is that there is no wear whatsoever on these parts.

At this point it may be well to emphasize that the calibration of the circuit breaker is determined by the relationship of these latching members under static conditions, that is, when the circuit breaker is closed and the bimetal element is at room temperature. The relative position of the end 60' of the bimetal element with respect to the end of the shouldered portion 47ª of the lever 47 determines the amount of temperature rise necessary to release the circuit breaker and hence represents the calibration of the instrument. Obviously wear at the nose of the shouldered portion 47ª of the lever 47 will quickly upset this calibration and render the breaker useless for its normal and intended purpose.

Likewise during this closing motion the spring 31 in the bottom of the device is placed under stress so that as soon as the pressure is let up on the knob 13 or it is turned backwardly, that is, in a counterclockwise direction, the carrier 20 will move back a short distance until the latch lever 24 engages in the notch 25 in the circular wall of the housing 3, see Figure 16. If the knob is released the parts stop in this position. At this time, as is clear from Figure 16, it will be seen that although the contact 51 is projected it does not engage the fixed contact 18. Thus the main circuit is not yet closed. This is the in-between position referred to above.

In order to put the device in "on" position, the knob 13 is rotated to "on" position and as this is done the face 35' of the cam 35 moves around to engage the adjacent end of the latch 24 and moves it out of the notch 25. This frees the carrier so that under the influence of spring 31 it moves to the position shown in Figures 15 and 17, at which time contacts 51 and 18 engage to lock the carrier against any further movement. This movement of cam 35 causes the shoulder 40 on it to pass the latch 39 so that any attempt to again rotate the knob in a clockwise direction will be prevented. This involves the so called "free tripping" of the device, that is to say, that once it moves to closed circuit position it is out of the control of the operator to the extent that he could not hold it in that position. Thus, if the circuit is closed on an overload it cannot be held on it and is free to immediately open the circuit. The latch 39 cooperates with the side of the carrier 20, which is a little higher than the plane of the top of the carrier, as is clear from Figure 8 and which portion includes the shoulder 28. Thus when the switch goes to "off" position the latch 39 is moved out of the way so that the cam 35 may pass it during motion of the device to "re-set" position.

In the "on" position, the parts as stated above are as illustrated in Figures 15 and 17. The toggle linkage which includes the contact 51 is in a straight line and is held against being collapsed by the spring 52' with the end of lever 47 resting on the end of bimetal element 60 (see Figure 11). With the device in "on" position, current flows from the circuit through contact 18, contact 51, flexible connection 62, that portion of the bimetal element 60 between the clip 61 and the support 59 through the support to the center lead 43 through the flexible connection 32 on the bottom of the device to the other circuit wire.

When an overload develops in the device the bimetal element 60 is so constructed that it curves outwardly, that is, its free end moves toward the right, Figure 15, until it disengages the lever 47. When this happens spring 52' will force the toggle linkage out of alignment so that it collapses, withdrawing the contact 51 into the carrier. The result is that the locking engagement of that contact with the fixed contact 18 is destroyed and the relatively heavy coil spring 31 causes the carrier to snap to the "off" position, Figure 10.

At this point it might be well to note that the bimetal element is made as illustrated in Figure 19 so that only a portion of it is included in the circuit, thereby reducing the resistance of this portion of the circuit and keeping the load imposed by the device, which is a "loss load," small. The end 60' of the bimetal element is of reduced section so that it will heat by conduction to the same temperature as the rest of the element so that the whole element will perform its function.

Another advantage of this arrangement is that it removes the connection from the region of the point of engagement between the bimetal element 60 and the end 47ª of lever 47 thereby simplifying the structure. Likewise, it may be noted that the carrier is relatively free in its supports at the hub 41 and the screw 34 so that it can be moved around under the stresses on the device at closed circuit position so that the contacts 51 and 18 may properly align to ensure locking and a maximum area of contact therebetween. The construction provides what may be termed a floating contact carrier or member because of its freedom of motion to permit proper alignment of the contacts. Since the end faces of contacts 51 and 18 are plane and it is across these faces that the current flows, it is naturally desirable that the maximum area of contact result. The spring 31 exerts a fairly large force on the device and by leaving the carrier free in the manner explained the contacts can properly engage. The collar or shoulder 42, Figure 8, ensures that there will not be any undue tipping of the carrier while allowing this alignment of the parts.

When the device springs to open circuit condition any arc that may be drawn between the contacts 51 and 18 is drawn, Figure 17, in a counterclockwise direction down into the narrow confines of the arcuate chamber between the wall of the housing and the wall of the carrier. At the same time the gases generated rapidly build up the pressure in this restricted chamber so that the arc is rapidly extinguished. This pressure is relieved through passage 29 into chamber 30, see Figure 6, and finally escapes through the port 30'. By the time it reaches the atmosphere it has sufficiently expanded and cooled so that it is no longer a source of fire or injury hazard.

When the device is in "on" position as shown in Figure 17 it may be manually put in "off" position by turning the knob 13 from its up and down position to its "off" position. As this movement occurs, the face 35", Figure 12, of cam 35 engages the finger 27, causing it to rotate in a counterclockwise direction. This moves the finger 27', Figure 17, into engagement with the free end 60' of the bimetal element and then springs it out of engagement with the end of lever 47. This, of course, frees the toggle so that the spring 52' may collapse it and the device springs to "off" position. The carrier is stopped in its opening movement at about the time spring 31 has expended its force by engagement of the lug 20' on the bottom of the carrier 20 with the end of the arcuate groove in the bottom of the casing 3, see Figure 18. The device is then ready for a new cycle of operations to close the circuit to which it is connected.

For emphasis it may be noted that the plane of engagement between the faces of the contacts 51 and 18 is offset or at an angle to a tangent to the carrier in the region of the contact so that there is a sort of wedging action resulting from the attempt of the contact 51 to move past the contact 18 as long as contact 51 is held in projected position. This ensures a positive lock and thereby eliminates separate locking mechanism for holding the carrier in circuit closed position. The contact 51 moves through an opening in the side wall of the carrier 20 so as to engage the sides of the opening at its sides and thereby allow it only a straight line or longitudinal movement. In other words, the slot 20'', see Figure 10, in which an ear of the cover 21 lies, connects with a lower slot 20a in which the contact 51 has a sliding fit.

From the above description it will be apparent to those skilled in the art that the invention herein disclosed may be embodied in still other physical structures without departure from the novel subject matter thereof. I do not, therefore, desire to be limited to the disclosure as given for purposes of illustration but rather to the scope of the claims granted me.

What is claimed is:

1. In a circuit breaker of the type described, the combination including a housing having a fixed contact thereon, an oscillatable carrier in said housing having a contact thereon, spring means for urging the carrier to open circuit position in which said contacts are out of engagement, means for moving the carrier to closed circuit position and for projecting the contact thereon so as to engage the fixed contact and hold the carrier in closed circuit position, and means including a pair of latching members for moving the contact on the carrier with respect to said fixed contact, one of said latching members being heat responsive so that upon overload said carrier moves to open circuit position and the other of said latching members being pivotally and slidably mounted, and means for causing said other of said latching members to first slide and then pivot to first recede from and then progress towards the other latching member during closing movement of the device.

2. In a circuit breaker of the type described, the combination comprising a pair of cooperating latching members for holding the circuit breaker in closed position, one of said latching members being fixed and the other pivotally and slidably mounted and means for causing said other of said latching members to first slide to recede from and then pivot to progress towards the other of said latching members into latching relation therewith as the circuit breaker is operated to closed position.

3. In the combination of claim 2, the other of said latching members being heat responsive.

4. In the combination of claim 2, the other of said latching members being a bimetal element.

5. In a circuit breaker of the type described, a pair of cooperating latching members for holding the breaker in position, one of said latching members being pivotally fixed, means for supporting the other of said latching members for pivotal and relative movement with respect to said first latching member, and means for causing recessional movement first followed by pivotal movement towards said fixed latching member during the movement of the circuit breaker to on position.

6. In combination of claim 5, said last means including a camming member and a spring cooperating with said second latching member.

7. In a circuit breaker of the type described, the combination including a fixed contact, an oscillatable carrier having a contact therein, spring means for urging the carrier to disengaging position of said contacts, means for moving the carrier to contact engaging position, means for holding the carrier in contact engaging position including a pair of cooperating latching members, one of said latching members being relatively fixed on said carrier and the other pivotally and slidably mounted with respect to said first latching member, and means for causing said last latching member to pivot and slide when said carrier is moved to circuit closing position whereby it is moved to latching position without engagement with said relatively fixed latching member.

8. In the combination of claim 7, cam means for causing the pivotal and sliding movement of said other latching member during operation of said carrier to contact engaging position.

9. In the combination of claim 7, means for causing the pivotal and sliding movement of said other latching member during operation of said carrier to contact engaging position including a camming member and a spring cooperating with said other latching member.

10. In a circuit breaker of the type described, the combination including a housing having a fixed contact thereon, an oscillatable carrier in said housing having a contact slidably mounted therein, spring means for urging the carrier to contact disengaging position, means for moving the carrier to contact engaging position, a relatively fixed latching member mounted on said carrier, a second latching member pivotally and slidably mounted on said carrier, a toggle linkage interconnecting said latching member with the contact on said carrier, and means for causing pivotal and sliding movement of said last latching member with respect to said fixed latching member during movement of said carrier to contact engaging position, whereby said latching members are not engaged until said toggle linkage is in straight line formation.

11. In the combination of claim 10, said last means including a camming member and a spring cooperating with said last latching member.

12. In the combination of claim 10, said relatively fixed latching member being heat responsive.

13. In the combination of claim 10, said last means including a camming member and a spring cooperating with said last latching member and said fixed latching member being heat responsive.

FRANK GUBING.

REFERENCES CITED

The following references are of record in the file of this patent:

UNITED STATES PATENTS

| Number | Name | Date |
| --- | --- | --- |
| 2,261,139 | Burnside | Nov. 4, 1941 |